United States Patent
Lee et al.

(10) Patent No.: US 12,327,286 B2
(45) Date of Patent: Jun. 10, 2025

(54) METHOD AND SYSTEM FOR RESPONDING TO MALICIOUS COMMENTS

(71) Applicant: NAVER CORPORATION, Gyeonggi-do (KR)

(72) Inventors: Kyuho Lee, Seongnam-si (KR); Seunghee Shim, Seongnam-si (KR); Nam Jeung Im, Seongnam-si (KR); Taehyun Hwang, Seongnam-si (KR)

(73) Assignee: NAVER CORPORATION, Gyeonggi-Do (KR)

( * ) Notice: Subject to any disclaimer, the term of this patent is extended or adjusted under 35 U.S.C. 154(b) by 49 days.

(21) Appl. No.: 17/499,067

(22) Filed: Oct. 12, 2021

(65) Prior Publication Data

US 2022/0114679 A1    Apr. 14, 2022

(30) Foreign Application Priority Data

Oct. 13, 2020    (KR) .................. 10-2020-0131657

(51) Int. Cl.
*G06Q 50/00* (2024.01)
*G06F 16/2455* (2019.01)
(Continued)

(52) U.S. Cl.
CPC ......... *G06Q 50/01* (2013.01); *G06F 16/2455* (2019.01); *G06F 40/166* (2020.01);
(Continued)

(58) Field of Classification Search
CPC ... G06Q 50/01; G06F 16/2455; G06F 40/166; G06F 40/279; G06F 40/30; G06F 40/284; H04L 51/212; H04L 51/52
See application file for complete search history.

(56) References Cited

U.S. PATENT DOCUMENTS 10,116,614 B1 * 10/2018 Rihn ................. H04L 51/212
11,282,509 B1 *  3/2022 Li ........................ G06F 16/65
(Continued)

FOREIGN PATENT DOCUMENTS

KR    10-2009-0001435 A    1/2009
KR       20220000679 A  *  6/2020

OTHER PUBLICATIONS

Xiang, Guang et al. Detecting offensive tweets via topical feature discovery over a large scale twitter corpus. 2012. Association for Computing Machinery. Proceedings of the 21st ACM International Conference on Information and Knowledge Management. 1980-1984. (Year: 2012).*

(Continued)

*Primary Examiner* — Sarah M Monfeldt
*Assistant Examiner* — Karma A El-Chanti
(74) *Attorney, Agent, or Firm* — Harness, Dickey & Pierce, P.L.C.

(57) ABSTRACT

A comment management method implemented by a computer apparatus comprising at least one processor configured to execute computer-readable instructions included in a memory includes detecting, by the at least one processor, a malicious comment based on context through a learning-based artificial intelligence (AI) model; providing, by the at least one processor, a notification for disallowing a registration or requesting a registration reconsideration according to an attempt to register the malicious comment; providing, by the at least one processor, the malicious comment by performing blind-processing on at least a portion of a sentence corresponding to the malicious comment; and restricting, by the at least one processor, the use of at least a portion of services for a user that repeatedly registers the malicious comment.

13 Claims, 10 Drawing Sheets

(51) Int. Cl.
  *G06F 40/166* (2020.01)
  *G06F 40/279* (2020.01)
  *G06F 40/30* (2020.01)
  *H04L 51/212* (2022.01)
  *H04L 51/52* (2022.01)

(52) U.S. Cl.
  CPC ............ *G06F 40/279* (2020.01); *G06F 40/30* (2020.01); *H04L 51/212* (2022.05); *H04L 51/52* (2022.05)

(56) References Cited

U.S. PATENT DOCUMENTS

| | | | | |
|---|---|---|---|---|
| 2005/0278620 | A1* | 12/2005 | Baldwin | H04W 4/14 715/201 |
| 2009/0070376 | A1* | 3/2009 | Eom | G06F 40/169 |
| 2012/0323565 | A1* | 12/2012 | Hildreth | H04L 51/212 704/10 |
| 2013/0018965 | A1* | 1/2013 | Ramachandran | G06Q 50/01 709/206 |
| 2013/0138735 | A1* | 5/2013 | Kanter | H04L 51/212 709/204 |
| 2016/0337293 | A1* | 11/2016 | Koum | H04L 67/306 |
| 2018/0013706 | A1* | 1/2018 | Rathbone | H04L 51/212 |
| 2018/0060319 | A1* | 3/2018 | Ko | G06F 16/2255 |
| 2019/0026601 | A1* | 1/2019 | Packalen | G06F 40/30 |
| 2019/0141068 | A1* | 5/2019 | Park | G06N 20/00 |
| 2019/0179895 | A1* | 6/2019 | Bhatt | G06Q 50/01 |
| 2019/0266242 | A1* | 8/2019 | Arumugam | G06N 7/01 |
| 2020/0053035 | A1* | 2/2020 | Mukherjee | G06N 5/046 |
| 2020/0142999 | A1* | 5/2020 | Pedersen | G06F 18/23 |
| 2020/0145430 | A1* | 5/2020 | Vallur | H04L 51/212 |
| 2021/0058352 | A1* | 2/2021 | Fogu | G06F 40/279 |
| 2022/0109646 | A1* | 4/2022 | Lakshmipathy | G06F 40/169 |

OTHER PUBLICATIONS

Nobata, Chikashi et al. Abusive Language Detection in Online User Content. 2016. International World Wide Web Conferences Steering Committee. Proceedings of the 25th International Conference on World Wide Web. 145-153. (Year: 2016).*

News Article, Feb. 19, 2020, https://moneys.mt.co.kr/news/mwPrint.html?no=2020021917108057510&type=1<https://protect-us.mimecast.com/s/BfzlCJ6YyzCBKr4YSVH5Jg>.

News Article, Jul. 17, 2020, https://d2.naver.com/helloworld/7753273_ <https://protect-us.mimecast.com/s/720mCKrY1zUD4EAnTvEgcl>.

News Article, Jun. 18, 2020, https://www.chosun.com/site/data/html_dir/2020/06/18/2020061802124.html_<https://protect-US.mimecast.com/s/qlezCL9Y70TkQjo1SPx-Om>.

* cited by examiner

800

Service screen

You have written the article that is
restricted in the service operation
regulation so you are subject to a
restricted service use, including writing,
from June 29 to June 30, 2018.

You can use the service again
after the restricted period expires.

Learn more about restrictions

Yes

810

METHOD AND SYSTEM FOR RESPONDING TO MALICIOUS COMMENTS

CROSS-REFERENCE TO RELATED APPLICATION(S)

This U.S. non-provisional application claims the benefit of priority under 35 U.S.C. § 119 to Korean Patent Application No. 10-2020-0131657 filed on Oct. 13, 2020, in the Korean Intellectual Property Office (KIPO), the entire contents of which are incorporated herein by reference.

BACKGROUND

1. Field

One or more example embodiments relate to a technology for managing comments.

2. Related Art

With the development of Internet technology, the use of Internet becomes widespread and an age group of Internet users has expanded from children to the elderly. Internet users may easily obtain desired information and freely express their thoughts or opinions.

More frequently, users express their opinions or feedback on a specific object, for example, a person, a product, an event, and content, through comments on the Internet and the corresponding influence power is also increasing.

There are rampant acts of posting malicious comments, such as blaming, blasphemy, or slandering a specific target by some netizens by exploiting anonymity that information on a commenter is disclosed only with a user identifier or is not disclosed at all.

Currently, a method of blocking a registration of a malicious comment is developed and provided. For example, technology for blocking an emoticonized malicious comment as well as a malicious comment in a form of a general word has been developed.

SUMMARY

One or more example embodiments provide a method and system that may respond to a malicious comment including an inappropriate expression through a learning-based artificial intelligence (AI) bot.

One or more example embodiments provide a method and system that may respond to a malicious comment with a series of processes of requesting a reconsideration for comment registration, performing blind-processing on at least a portion of the malicious comment if the malicious comment is registered, and restricting a service use for a repeated registration.

One or more example embodiments provide a method and system that may simultaneously perform a process of detecting a malicious comment based on context through an AI bot, a process of detecting the malicious comment using a keyword included in a database and/or a process of detecting the malicious comment through reporting or monitoring.

According to at least some example embodiments, a comment management method implemented by a computer apparatus comprising at least one processor configured to execute computer-readable instructions included in a memory includes detecting, by the at least one processor, a malicious comment based on context through a learning-based artificial intelligence (AI) model; providing, by the at least one processor, a notification for disallowing a registration or requesting a registration reconsideration according to an attempt to register the malicious comment; providing, by the at least one processor, the malicious comment by performing blind-processing on at least a portion of a sentence corresponding to the malicious comment; and restricting, by the at least one processor, the use of at least a portion of services for a user that repeatedly registers the malicious comment.

The detecting may include detecting the malicious comment by simultaneously performing a first process of detecting a comment corresponding to a malicious comment criterion based on the context and a second process of detecting a comment that includes a keyword that is included in a database.

The providing of the notification may include providing a registration disallowance notification for a comment for which the AI model determines a malicious comment prediction score greater than or equal to a first reference value; and providing a registration reconsideration request notification for a comment for which the AI model determines a malicious comment prediction score less than the first reference value and greater than or equal to a second reference value.

The providing of the notification may further include providing the registration disallowance notification for a comment that includes a keyword set as a banned word; and providing the registration reconsideration request notification for a comment that includes a keyword set as a substitution word that is a variant of the banned word.

The providing of the malicious comment may include determining whether to perform blind-processing on the malicious comment based on a user setting for a malicious comment filtering function.

The providing of the malicious comment may include performing blind-processing on an entire sentence corresponding to the malicious comment when the malicious comment filtering function is turned ON; and displaying the sentence corresponding to the malicious comment without blind-processing when the malicious comment filtering function is turned OFF.

The providing of the malicious comment may further include replacing a keyword set as a substitution word that is a variant of a banned word among keywords included in the malicious comment with a symbol and displaying the corresponding comment in which the keyword is replaced with the symbol when the malicious comment filtering function is turned OFF.

The comment management method may further include simultaneously performing, by the at least one processor, the first process, the second process and a third process of processing a comment selected by an administrator through reporting or monitoring among registered comments as the malicious comment that violates a service operation regulation.

The comment selected by the administrator as a comment that violates the service operation regulation may be used for at least one of learning of the AI model or for keyword collection.

The restricting may include restricting at least a portion of activities including a comment writing activity during a first period of time for a user that registers a comment for which registration reconsideration is requested a fist number of times or more during a unit period.

According to at least some example embodiments, a non-transitory computer-readable record medium stores instructions that, when executed by a processor, cause the processor to implement the comment management method.

According to at least some example embodiments, a computer apparatus includes memory storing computer-executable instructions; and at least one processor configured to execute the computer-executable instructions such that the at least one processor is further configured to, detect a malicious comment based on context through a learning-based artificial intelligence (AI) model; provide a notification for disallowing a registration or requesting a registration reconsideration according to an attempt to register the malicious comment; provide the malicious comment by performing blind-processing on at least a portion of a sentence corresponding to the malicious comment; and restrict the use of at least a portion of services for a user that repeatedly registers the malicious comment.

The at least one processor may be configured to execute the computer-executable instructions such that the at least one processor is further configured to detect the malicious comment by simultaneously performing a first process of detecting a comment corresponding to a malicious comment criterion based on the context and a second process of detecting a comment that includes a keyword that is included in a database.

The at least one processor may be configured to execute the computer-executable instructions such that the at least one processor is further configured to provide a registration disallowance notification for a comment for which the AI model determined a malicious comment prediction score greater than or equal to a first reference value, and provide a registration reconsideration request notification for a comment for which the AI model determined a malicious comment prediction score less than the first reference value and greater than or equal to a second reference value.

The at least one processor may be configured to execute the computer-executable instructions such that the at least one processor is further configured to provide the registration disallowance notification for a comment that includes a keyword set as a banned word, and provide the registration reconsideration request notification for a comment that includes a keyword set as a substitution word that is a variant of the banned word.

The at least one processor may be configured to execute the computer-executable instructions such that the at least one processor is further configured to determine whether to perform blind-processing on the malicious comment based on a user setting for a malicious comment filtering function.

The at least one processor may be configured to execute the computer-executable instructions such that the at least one processor is further configured to perform blind-processing on an entire sentence corresponding to the malicious comment when the malicious comment filtering function is turned ON, display the sentence corresponding to the malicious comment without blind-processing when the malicious comment filtering function is turned OFF, and replace a keyword set as a substitution word that is a variant of a banned word among keywords included in the malicious comment with a symbol and display the corresponding comment in which the keyword is replaced with the symbol when the malicious comment filtering function is turned OFF.

The at least one processor may be configured to execute the computer-executable instructions such that the at least one processor is further configured to simultaneously perform the first process, the second process, and a third process of processing a comment selected by an administrator through reporting or monitoring among registered comments as the malicious comment that violates a service operation regulation.

The at least one processor may be configured to execute the computer-executable instructions such that the at least one processor is further configured to use the comment selected by the administrator as a comment that violates the service operation regulation for learning of the AI model or for keyword collection.

The at least one processor may be configured to execute the computer-executable instructions such that the at least one processor is further configured to restrict at least a portion of activities including a comment writing activity during a first period of time for a user that registers a comment for which registration reconsideration is requested a first number of times or more during a unit period.

According to some example embodiments, a large amount of malicious comments may be detected in real time by detecting a malicious comment including an inappropriate expression through a learning-based AI bot and a detection range before comment registration may be greatly expanded accordingly.

According to some example embodiments, it is possible to efficiently respond to a malicious comment by applying a series of processes of requesting a reconsideration for comment registration, performing partial blind-processing on at least a portion of the malicious comment if the malicious comment is registered, and restricting a service use for a repeated registration.

According to some example embodiments, it is possible to increase a malicious comment reduction rate and to improve the effectiveness of a comment regulation by simultaneously performing a process of detecting a malicious comment based on context through an AI bot, a process of detecting the malicious comment using a keyword included in a database and/or a process of detecting the malicious comment through reporting or monitoring.

Further regions of applicability will become apparent from the description provided herein. The description and specific examples in this summary are intended for purposes of illustration only and are not intended to limit the scope of the present disclosure.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
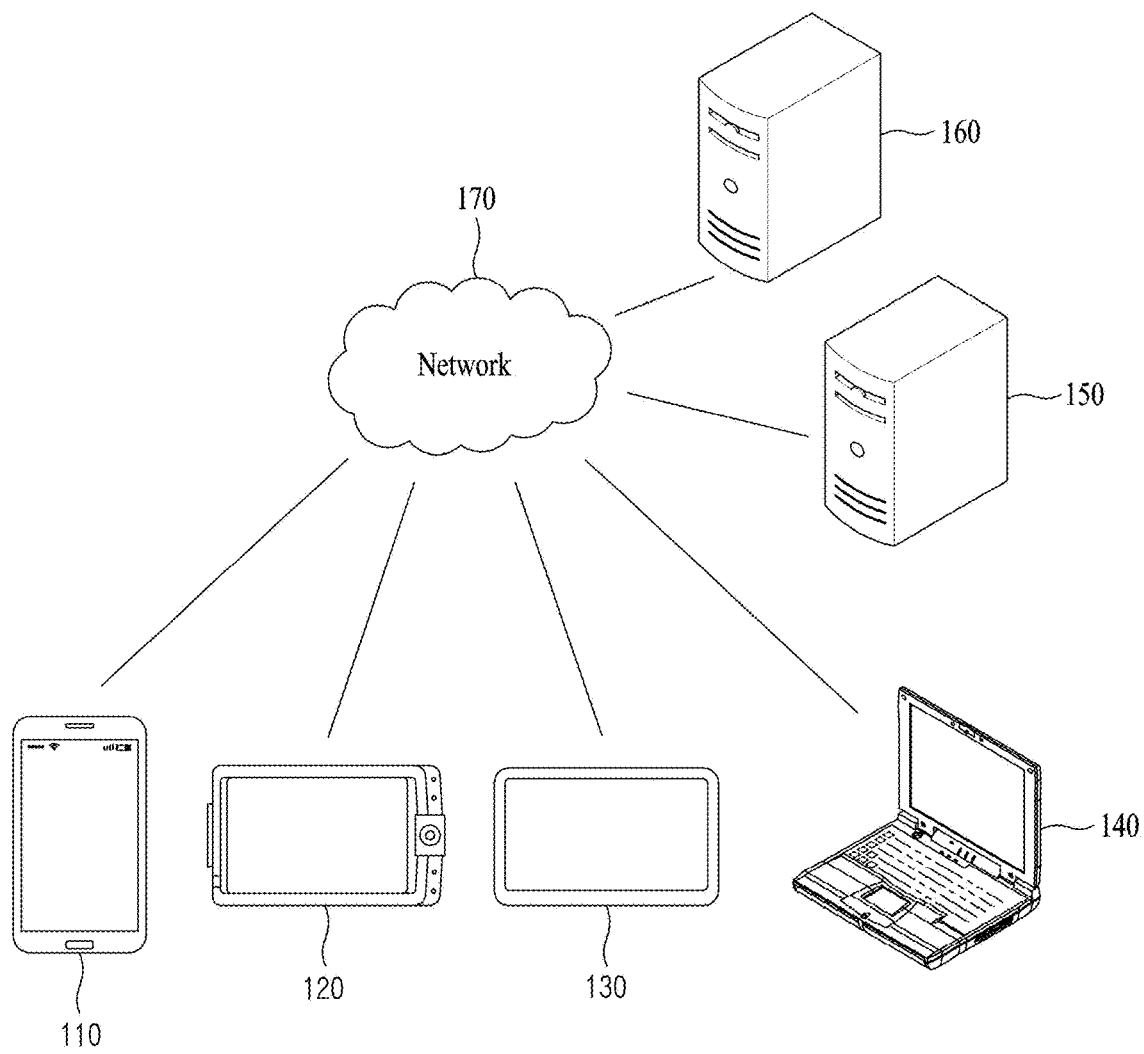
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be described as being embodied by one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A comment management system according to example embodiments may be implemented by at least one computer apparatus, and a comment management method according to at least some example embodiments may be performed through at least one computer apparatus included in the comment management system. A computer program according to an example embodiment may be installed and executed on the computer apparatus and the computer apparatus may perform the comment management method according to at least some example embodiments under control of the executed computer program. The computer program may be stored in a non-transitory computer-readable medium to computer-implement the comment management method in conjunction with the computer apparatus.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as one example only among environments applicable to at least some of the example embodiments and an environment applicable to at least some of the example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. For example, the service may include a search service, a content providing service, a social network service, a map service, a translation service, a financial service, and the like.

Figure 2:
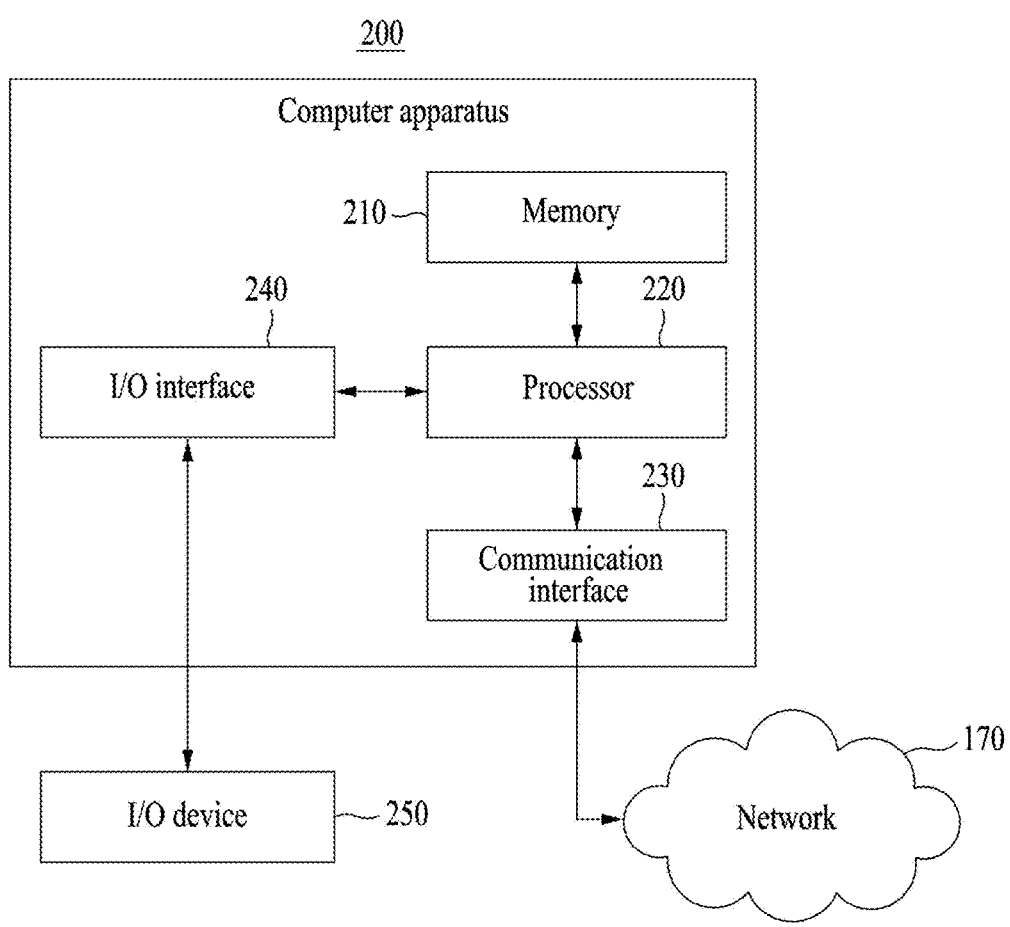
FIG. 2 is a diagram illustrating an example of a computer apparatus according to at least one example embodiment.

FIG. 2 is a diagram illustrating an example of a computer apparatus according to an example embodiment. Each of the plurality of electronic devices 110, 120, 130, and 140 or each of the servers 150 and 160 may be implemented by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable storage medium. The permanent mass storage device, such as ROM and a disk drive, may be included in the computer apparatus 200 as a permanent storage device separate from the memory 210. Also, an OS and at least one program code may be stored in the memory 210. Such software components may be loaded to the memory 210 from another non-transitory computer-readable storage medium separate from the memory 210. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 210 through the communication interface 230, instead of, or in addition to, the non-transitory computer-readable storage medium. For example, software components may be loaded to the memory 210 of the computer apparatus 200 based on a computer program installed by files received over a network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to a program code stored in a storage device, such as the memory 210.

The communication interface 230 may provide a function for communication between the computer apparatus 200 and another apparatus, for example, the aforementioned storage devices, over the network 170. For example, the processor 220 of the computer apparatus 200 may transfer a request or an instruction created based on the program code stored in the storage device, such as the memory 210, data, a file, etc., to other devices over the network 170 under control of the communication interface 230. Inversely, a signal, an instruction, data, a file, etc., from another apparatus may be received at the computer apparatus 200 through the communication interface 230 of the computer apparatus 200 by going through the network 170. For example, a signal, an instruction, data, etc., received through the communication interface 230 may be transferred to the processor 220 or the memory 210, and a file, etc., may be stored in a storage medium, for example, the permanent storage device, further includable in the computer apparatus 200.

The I/O interface 240 may be a device for interface with an I/O device 250. For example, an input device may include a device, such as a microphone, a keyboard, and a mouse, and an output device may include a device, such as a display and a speaker. As another example, the I/O interface 240 may be a device for interface with an apparatus in which an input function and an output function are integrated into a single function, such as a touchscreen. The I/O device 250 may be configured as a single device with the computer apparatus 200.

According to other example embodiments, the computer apparatus 200 may include a number of components greater than or less than the number of components shown in FIG. 2. However, there is no need to clearly illustrate many components according to the related art. For example, the computer apparatus 200 may be configured to include at least a portion of the I/O device 250 or may further include other components, such as a transceiver and a database.

Hereinafter, example embodiments of a method and system for responding to a malicious comment are described.

Figure 3:
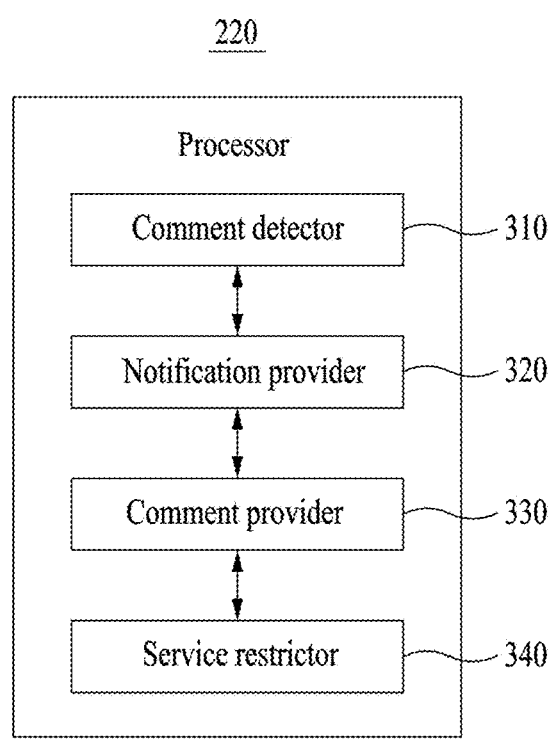
FIG. 3 is a diagram illustrating an example of a component includable in a processor of a computer apparatus according to at least one example embodiment.
Figure 4:
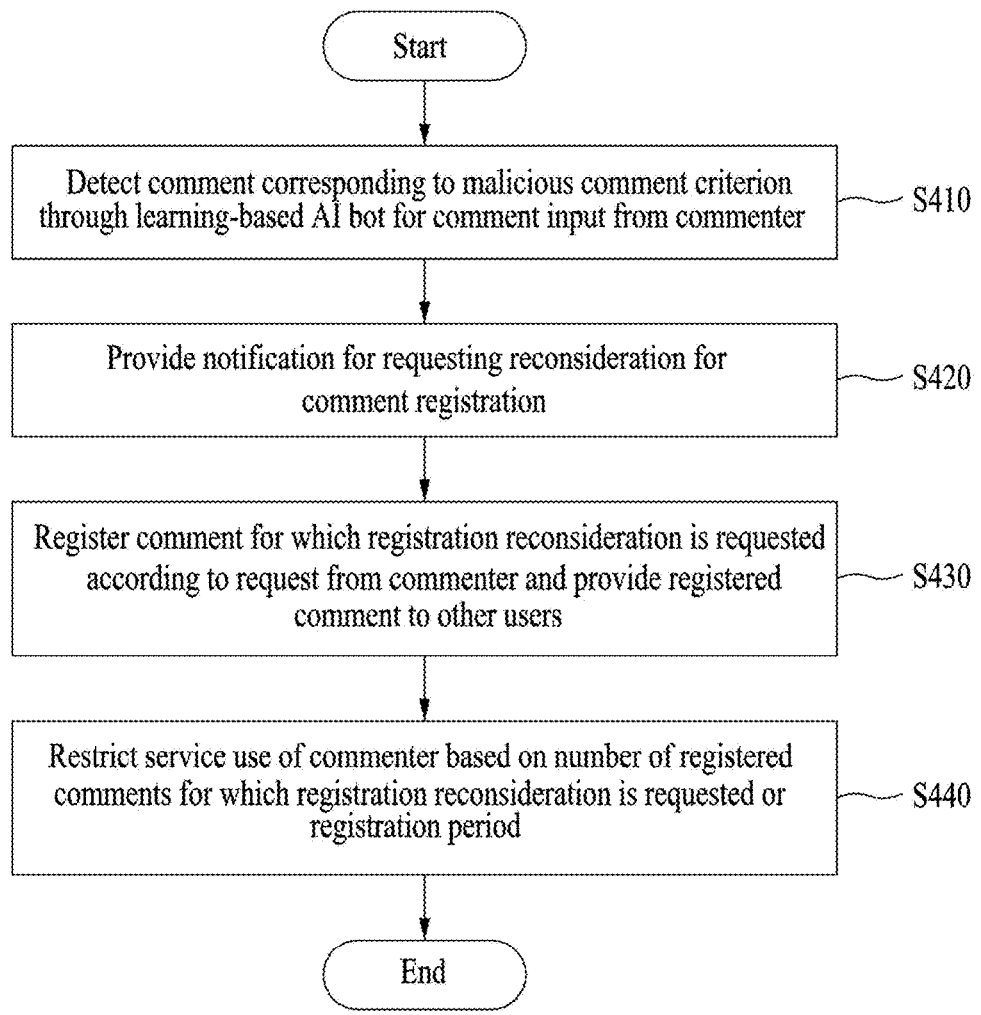
FIG. 4 is a flowchart illustrating an example of a method performed by a computer apparatus according to at least one example embodiment.

FIG. 3 is a diagram illustrating an example of a component includable in a processor of a computer apparatus according to at least one example embodiment, and FIG. 4 is a flowchart illustrating an example of a method performed by a computer apparatus according to at least one example embodiment.

The computer apparatus 200 according to at least some of the example embodiment may provide a client with a comment management service through connection to a dedicated application installed on the client or a website/mobile site related to the computer apparatus 200. A computer-implemented comment management system may be configured in the computer apparatus 200.

Referring to FIG. 3, the processor 220 of the computer apparatus 200 may include a comment detector 310, a notification provider 320, a comment provider 330, and a service restrictor 340 as components to perform the comment management method of FIG. 4. For example, according to at least some example embodiments, the memory 210 may store program code including computer-executable instructions that, when executed by the processor 220, cause the processor 220 to implement any or all of the comment detector 310, notification provider 320, comment provider 330, and service restrictor 340. According to at least some example embodiments, the components of the processor 220 may be selectively included in or excluded from the processor 220. Also, According to at least some example embodiments, the components of the processor 220 may be separated or merged for representations of functions of the processor 220.

The processor 220 and the components of the processor 220 may control the computer apparatus 200 to perform operations S410 to S440 included in the comment management method of FIG. 4. For example, the processor 220 and the components of the processor 220 may be configured to execute an instruction according to a code of at least one program and a code of an operating system (OS) included in the memory 210.

Here, the components of the processor 220 may be representations of different functions performed by the processor 220 in response to an instruction provided from a program code stored in the computer apparatus 200. For example, the comment detector 310 may be used as a functional representation of the processor 220 that controls the computer apparatus 200 to detect a malicious comment including an inappropriate expression.

The processor 220 may read a necessary instruction from the memory 210 to which instructions associated with control of the computer apparatus 200 are loaded. In this case, the read instruction may include an instruction for controlling the processor 220 to perform the following operations S410 to S440.

The following operations S410 to S440 may be performed in order different from order illustrated in FIG. 4. Also, a portion of operations S410 to S440 may be omitted or an additional process may be further included.

Referring to FIG. 4, in operation S410, the comment detector 310 may detect a malicious comment written with various types of inappropriate expressions, such as profanity, a violent expression, a derogatory expression, and a discriminatory expression, through a learning-based artificial intelligence (AI) bot. The AI bot is implemented as a malicious comment detection model that learns sentences of inappropriate expressions based on AI technology and understands context of a sentence input as a comment. A malicious comment judgement criterion of the AI bot is expanded from words such as profanity to sentence context and may detect various anomalous words including a semantic change of the times for a language and even malicious content visually expressed using a space, a punctuation mark, and an emoticon. The AI bot may detect a malicious comment through learning in which the semantic change is applied, such as, for example, an expression used in a malicious sense in the past but now used in a favorable sense or vice versa. The comment detector 310 may determine whether a comment input from a commenter is a malicious comment in real time. Here, the comment detector 310 may detect a comment corresponding to a malicious comment criterion based on context through AI technology for malicious comment detection. The AI technology for malicious comment detection may employ at least one learning model that is already known and used.

In addition, the comment detector 310 may simultaneously perform a process of detecting a malicious comment including a keyword included in a database, with a process of detecting a malicious comment based on context through the AI bot. As keywords corresponding to profanity, violent expressions, derogatory expressions, and discriminatory expressions, banned words of which input as comments are prohibited and substitution words that are variants of the banned words may be prestored in the database. When a comment is written using a banned word or a substitution word included in the database, the comment detector 310 may classify the corresponding comment as a malicious comment. That is, the comment detector 310 may simultaneously perform a malicious comment detection process using the AI bot and a malicious comment detection process using a keyword database. The malicious comment detection process using the AI bot is based on context and the malicious comment detection process using the keyword database is based on a keyword. Therefore, by simultaneously performing both processes, a malicious comment that may be missed in one process may be detected in the other process and both processes may act in a complementary manner accordingly.

The malicious comment detection process using the AI bot and the malicious comment detection process using the keyword database may correspond to a process of detecting a malicious comment in real time in an operation of attempting to register a comment, and may also select a comment that violates a service operation regulation through reporting by other users or through monitoring by an administrator for comments that are registered and displayed for users and may process the selected comment as a malicious comment. The malicious comment detection process through reporting or monitoring may be additionally applied as a process capable of further complementing the malicious comment detection process using the AI bot and the malicious comment detection process using the keyword database. Also, the malicious comment detected through reporting or monitoring may be used as learning data of the AI bot for malicious comment detection and may also be used to collect a banned word or a substitution word.

In operation S420, when the comment input from the commenter is detected as the malicious comment in a stage of attempting to register a comment, the notification provider 320 may provide the commenter with a notification according to the corresponding attempt to register the malicious comment.

In the malicious comment detection process using the AI bot, if a score indicating a malicious comment prediction result is greater than or equal to a preset first reference (e.g., 0.98), the notification provider 320 may determine the corresponding comment as a non-registrable comment and may provide a registration disallowance notification. If a malicious comment prediction score is greater than or equal to a preset second reference (<first reference) (e.g., 0.97), the notification provider 320 may determine that the corresponding comment is highly likely to include an inappropriate expression and may provide a registration reconsideration request notification.

In the malicious comment detection process using the keyword database, if a sentence input as the comment includes a keyword set as a banned word, the notification provider 320 may determine the comment as a non-registrable comment and may provide a registration disallowance notification. Also, if the comment includes a keyword set as a substitution word, the notification provider 320 may determine that the comment is highly likely to include an inappropriate expression and may provide a registration reconsideration request notification.

In operation S430, the comment provider 330 may register the comment for which registration reconsideration is requested according to a request from the commenter and may provide the registered comment to other users. When the commenter requests registration of the comment despite the request for registration reconsideration, the comment provider 330 may register the corresponding comment and, here, may perform blind-processing on at least a portion of a sentence written as the comment and may display the blind-processed comment. For example, the comment provider 330 may determine whether to perform blind-processing on a comment detected as a malicious comment based on a user setting for a malicious comment filtering function. The comment provider 330 may display the comment detected as the malicious comment without blind-processing for a user that turns OFF the malicious comment filtering function, and may display the comment detected as the malicious comment through blind-processing for a user that turns ON the malicious comment filtering function. As used in the present specification, blind-processing particular content, such as a comment or a portion of a comment, refers to rendering the content less visible or, alternatively, invisible by, for example, hiding or blurring the content. Here, when the malicious comment filtering function is turned OFF, the comment provider 330 may display an entire sentence written as the comment as is. According to at least some example embodiments, although the malicious comment filtering function is turned OFF, a comment sentence may include a keyword set as a substitution word and, in this case, the comment provider 330 may display the corresponding comment in a state in which the substitution word is replaced with a symbol, etc., to make it impossible to identify the substitution word in the sentence.

In operation S440, the service restrictor 340 may restrict a service use of the corresponding commenter based on a registration status of the comment for which registration reconsideration is requested or a number of registrations, a registration period, and the like. If the commenter forces registration of the comment despite the request for reconsidering the registration according to the malicious comment detection, the service restrictor 340 may restrict at least a portion of activities including a comment writing activity as a service use penalty for the corresponding commenter. For example, the service restrictor 340 may block a writing activity during a predetermined (or, alternatively, desired) period of time for a user that registers a comment for which registration reconsideration is requested N or more times during a day.

Figure 5:
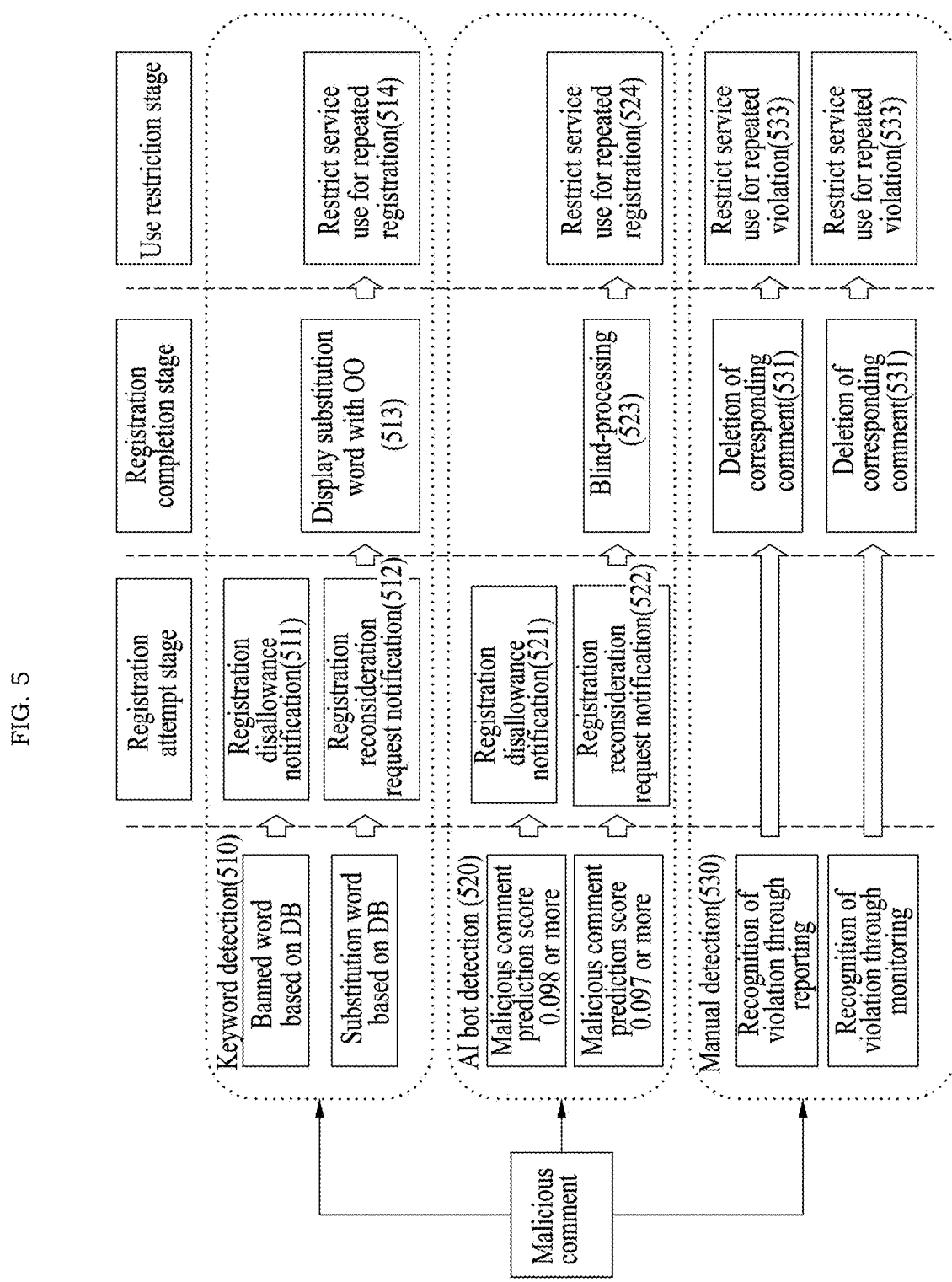
FIG. 5 illustrates an example of a stage-by-stage response process related to a malicious comment according to at least one example embodiment.

FIG. 5 illustrates an example of a stage-by-stage response process related to a malicious comment according to at least one example embodiment.

Referring to FIG. 5, the processor 220 may perform a malicious comment detection process 510 using a keyword database, a malicious comment detection process 520 using an AI bot, and a malicious comment detection process 530 through a manual detection, for example, reporting and monitoring as complementary processes for malicious comments.

The processor 220 may divide a malicious comment-related process into a registration attempt stage, a registration completion stage, and a use restriction stage, and may improve the effectiveness of a malicious comment regulation through a desired or, alternatively, optimal response process for each stage.

In the malicious comment detection process 510 using the keyword database, if a comment sentence includes a keyword set as a banned word in the registration attempt stage, the processor 220 determines the corresponding comment as a non-registrable comment and provides a registration disallowance notification (511). Here, if the comment sentence includes a keyword set as a substitution word, the processor 220 determines that the comment is highly likely to include an inappropriate expression and provides a registration reconsideration request notification (512). If a commenter forces registration of the comment for which registration reconsideration is requested, the processor 220 replaces the substitution word included in the comment sentence with a symbol "○" and displays the comment in which the substitution word is replaced with the symbol in the registration completion stage (513). The processor 220 may restrict a service use for the commenter that repeatedly registers the comment for which registration reconsideration is requested (514).

In the malicious comment detection process 520 using the AI bot, if a malicious comment prediction score through the AI bot is greater than or equal to a first reference in the registration attempt stage, the processor 220 determines the corresponding comment as a non-registrable comment and provides a registration disallowance notification (521). If the malicious comment prediction score is greater than or equal to a second reference (<the first reference), the processor 220 determines that the comment is highly likely to include an inappropriate expression and provides a registration reconsideration request notification (522). If the commenter forces registration of the comment for which registration reconsideration is requested, the processor 220 displays the corresponding comment in the registration completion stage and, here, performs blind-processing on the entire comment sentence (523). The processor 220 may restrict a service use for the commenter that repeatedly registers the comment for which registration reconsideration is requested (524).

The processor 220 may expand a detection range before comment registration by detecting a malicious comment by simultaneously performing the malicious comment detection process 510 using the keyword database and the malicious comment detection process 520 using the AI bot in the registration attempt stage.

In the malicious comment detection process 530 through the manual detection (reporting and monitoring), a malicious comment may not be detected in the registration attempt stage, but a malicious comment not detected in the registration attempt stage through other processes 510 and 520 may be selected and detected in the registration completion stage (531, 532). The processor 220 may select and delete a comment that violates a service operation regulation through reporting by other users or through monitoring by an administrator among comments that are registered and displayed for users. The processor 220 may restrict a service use for the commenter that repeatedly registers the comment that violates the service operation regulation (533, 534).

The malicious comment detection process 530 through the manual detection may select the malicious comment that has not been detected in the registration attempt stage after the registration completion stage and thus, may complement the malicious comment detection process 510 using the keyword database and the malicious comment detection process 520 using the AI bot.

In the use restriction stage, a criterion for restricting the service use may expand to a number of automatic processed malicious comments (i.e., a number of registered comments among comments for which registration reconsideration is requested) as well as a number of manual processed malicious comments (i.e., a number of registered comments among comments that are deleted due to violation of the service operation regulation).

The malicious comment selected as a direct response through reporting or monitoring may be used as learning data of the AI robot for malicious comment detection or may be used to collect a banned word or a substitution word.

FIGS. 6 to 10 illustrate examples of a user interface screen related to a malicious comment according to at least one example embodiment. FIGS. 6 to 10 illustrate examples of a user interface screen of a dedicated application installed on a client or a website/mobile site related to the computer apparatus 200.

Figure 6:
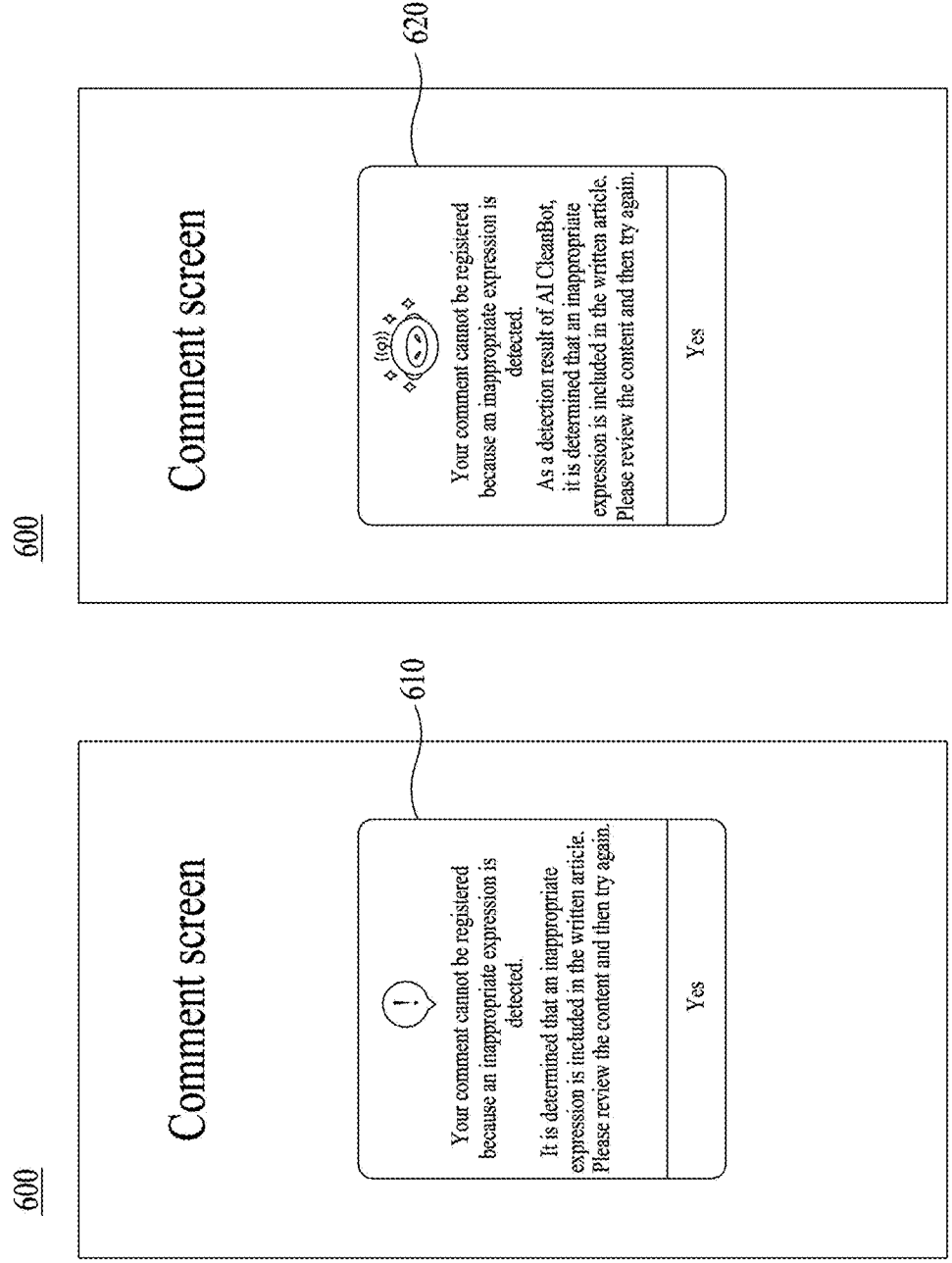
FIGS. 6 to 10 illustrate examples of a user interface screen related to a malicious comment according to at least one example embodiment.

Referring to FIG. 6, when a comment input through a comment screen 600 is determined as a malicious comment that includes a keyword set as a banned word through the malicious comment detection process 510 using the keyword database in the registration attempt stage, the processor 220 may provide a registration disallowance notification 610. In addition, when the comment input through the comment screen 600 is determined as a malicious comment with a malicious comment prediction score greater than or equal to a first reference through the malicious comment detection process 520 using the AI bot in the registration attempt stage, the processor 220 may provide a registration disallowance notification 620. When the comment input through the comment screen 600 is detected as the malicious comment through both processes 510 and 520, the processor 520 may provide the registration disallowance notification 620 based on the AI bot.

Figure 7:
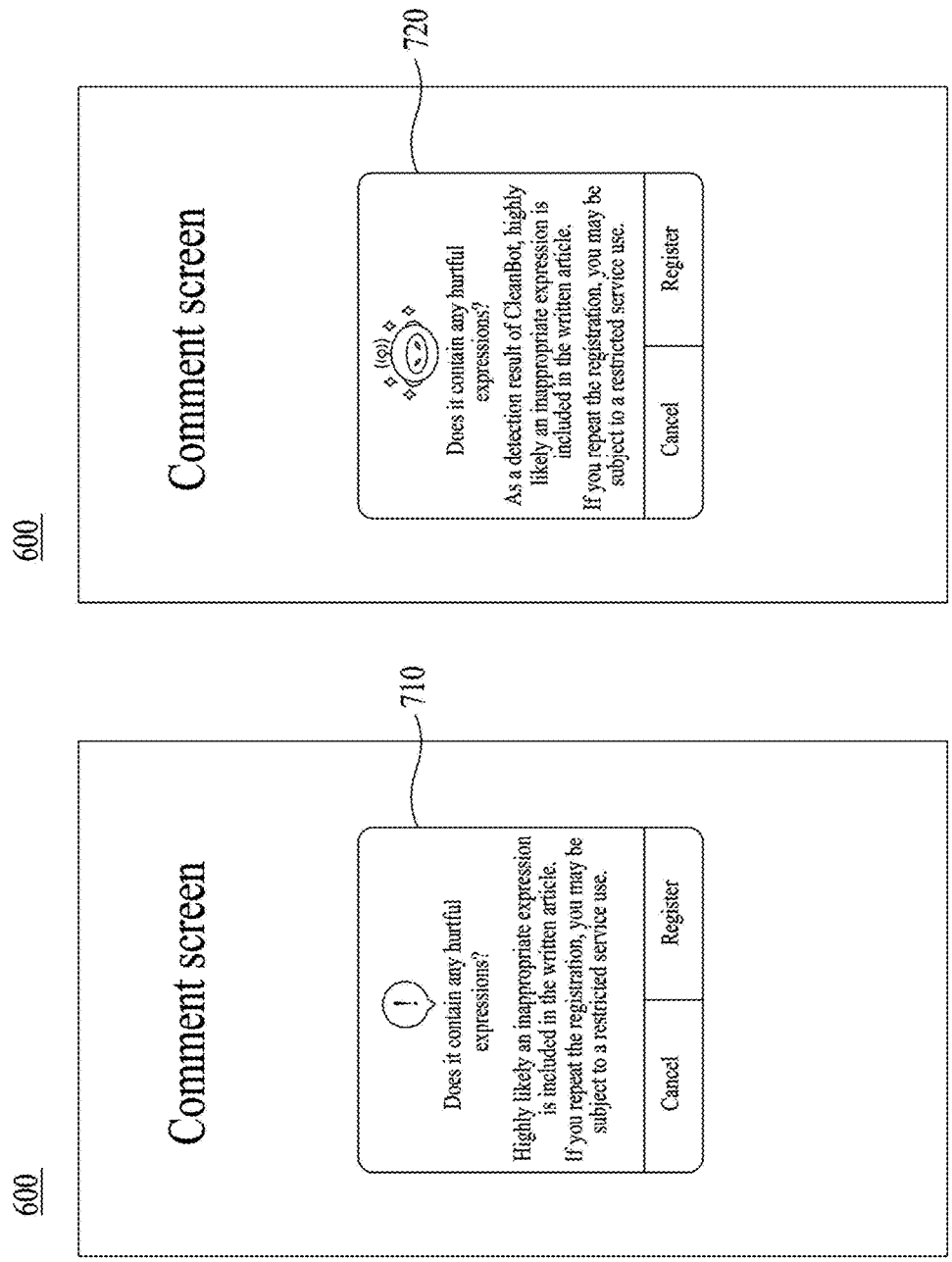

Referring to FIG. 7, when the comment input through the comment screen 600 is determined as a malicious comment that includes a keyword set as a substitution word through the malicious comment detection process 510 using the keyword database in the registration attempt stage, the processor 220 may provide a registration reconsideration request notification 710. In addition, when the comment input through the comment screen 600 is determined as a malicious comment with a malicious comment prediction score greater than or equal to a second reference (<the first reference) through the malicious comment detection process 520 using the AI bot in the registration attempt stage, the processor 220 may provide a registration reconsideration request notification 720. When the comment input through the comment screen 600 is detected as the malicious comment through both processes 510 and 520, the processor 520 may provide the registration reconsideration request notification 720 based on the AI bot.

Figure 8:

Referring to FIG. 8, the processor 220 may provide a service use restriction notification 810 on at least one service screen 800 including the comment screen 600 for a commenter that forces registration of a comment a preset number of times or more despite a request for reconsidering the registration according to malicious comment detection. That is, if a user that repeatedly registers a malicious comment attempts to use a service such as a comment registration, the processor 220 may restrict the corresponding service use and, at the same time, may notify the user that the user is subject to use a limited service due to a repeated malicious comment registration.

Figure 9:
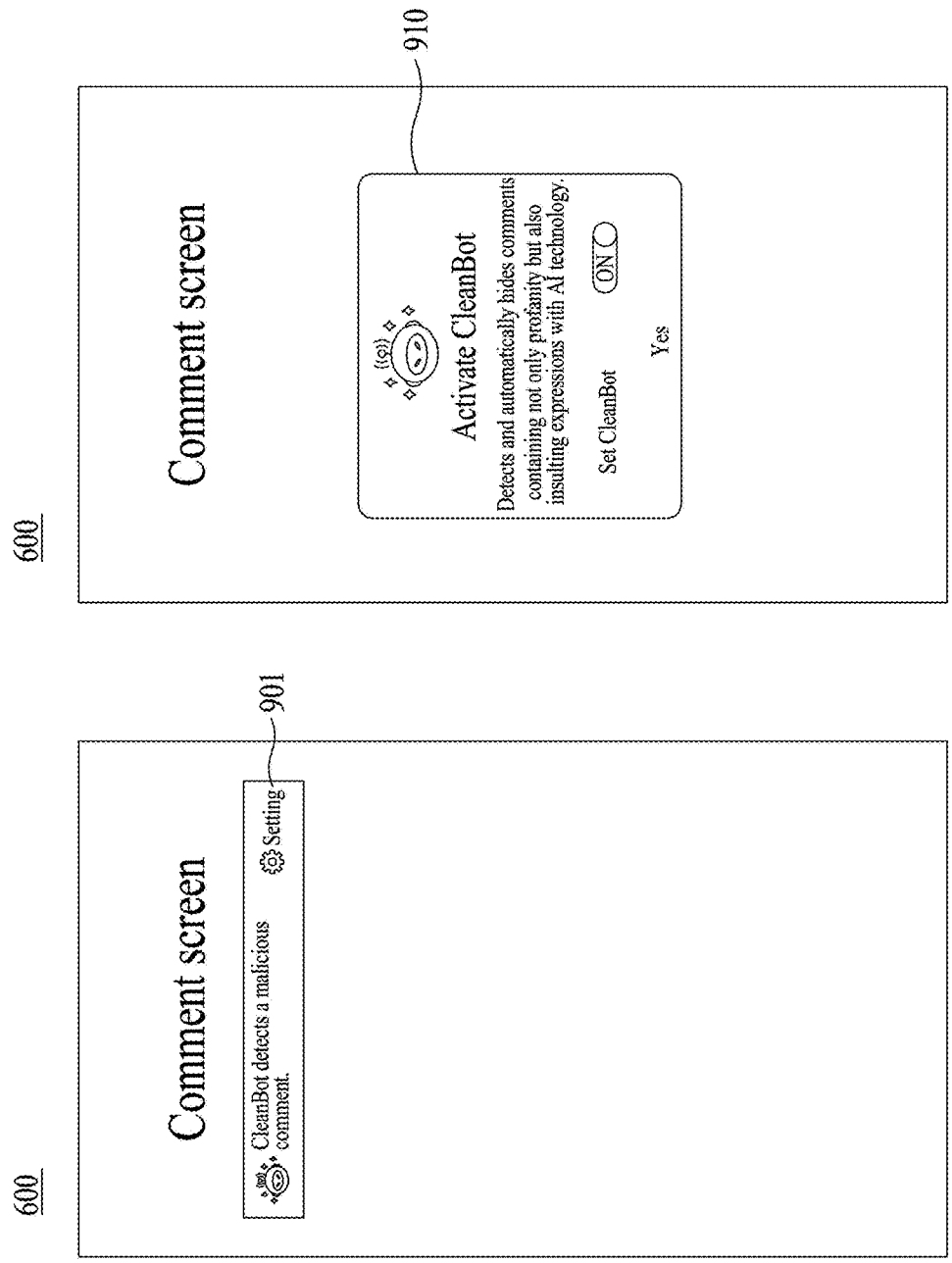

Referring to FIG. 9, the comment screen 600 may include a comment list with an interface for inputting a comment and may include a "setting" user interface (UI) 901 that allows a user to selectively set whether to use a malicious comment filtering function based on the AI bot. If a service user selects the "setting" UI 901 on the comment screen 600, the processor 220 provides a setting screen 910 capable of switching the malicious comment filtering function ON or OFF. The user that uses the service has an option of viewing a malicious comment and may directly set whether to use the malicious comment filtering function through the setting screen 910.

Figure 10:
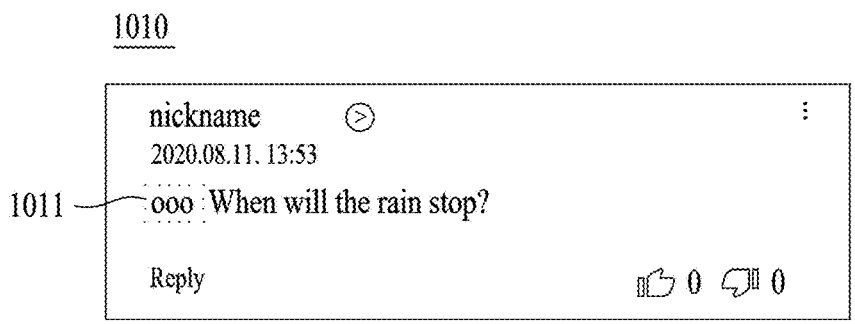
Figure 10:
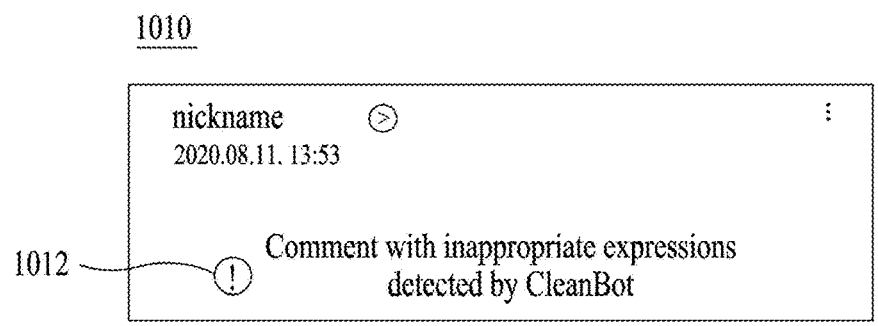
Figure 10:
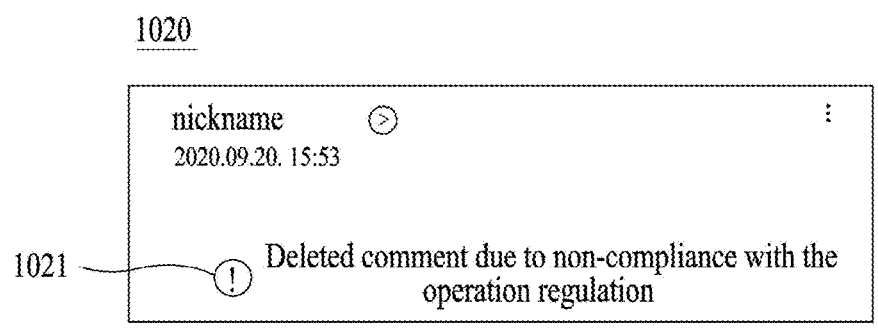

Referring to FIG. 10, when providing a malicious comment 1010 included in the comment screen 600 for a user that turns OFF the malicious comment filtering function, the processor 220 replaces a substitution word 1011 included in a comment sentence with a symbol "○" and displays the corresponding comment in which the substitution word 1011 is replaced with the symbol.

When providing the malicious comment 1010 included in the comment screen 600 for the user that turns ON the malicious comment filtering function, the processor 220 performs blind-processing on an entire comment sentence and displays a notification message 1012 indicating a comment of which display is blocked due to the malicious comment filtering function instead of displaying the comment sentence.

Regardless of the malicious comment filtering function, the processor 220 may delete a comment sentence of a malicious comment 1020 manually detected through reporting or monitoring in response to a request from an administrator. Since the comment sentence is deleted, the processor 220 displays a notification message 1021 indicating a comment that is deleted due to violation of the service operation regulation.

According to some example embodiments, a large amount of malicious comments may be detected in real time by detecting a malicious comment including an inappropriate expression through a learning-based AI bot and a detection range before comment registration may be greatly expanded accordingly. According to some example embodiments, it is possible to efficiently respond to a malicious comment by applying a series of processes of requesting a reconsideration for comment registration, performing partial blind-processing on at least a portion of the malicious comment if the malicious comment is registered, and restricting a service use for a repeated registration. According to some example embodiments, it is possible to increase a malicious comment reduction rate and to improve the effectiveness of a comment regulation by simultaneously performing a process of detecting a malicious comment based on context through an AI bot, a process of detecting a malicious comment using a keyword included in a database and/or a process of detecting a malicious comment through reporting or monitoring. According to some example embodiments, it is possible to provide a user with an option of viewing a malicious comment by supporting a user to directly set whether to use a malicious comment filtering function based on an AI bot.

The apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to at least some example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specifically designed to store program instructions (e.g., computer-executable instructions), such as read-only memory (ROM), random access memory (RAM), flash memory, and the like. Examples of other media may include recording media and storage media managed by an app store that distributes applications or a site, a server, and the like that supplies and distributes other various types of software. Examples of program instructions may include a machine language code produced by a compiler and a high-language code executable by a computer using an interpreter. The described hardware devices may be to act as one or more software modules in order to perform the operations of the above-described embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A comment management method implemented by a computer apparatus comprising at least one processor configured to execute computer-readable instructions included in a memory, the comment management method comprising:
   detecting, by the at least one processor, a malicious comment based on context through a learning-based artificial intelligence (AI) model during an attempt to register the malicious comment by simultaneously performing a first process of detecting a comment corresponding to a malicious comment criterion based on context of the comment corresponding to the malicious comment criterion, a second process of detecting a comment that includes a keyword that is included in a database, and a third process of processing a comment selected by an administrator through reporting or monitoring among registered comments as a comment that violates a service operation regulation;
   providing, by the at least one processor, a notification in response to the attempt to register the malicious comment, the notification being at least one of a registration disallowance notification or a registration reconsideration request notification;
   registering, by the at least one processor, the malicious comment after a second attempt to register the malicious comment if the notification is the registration reconsideration request notification, the registering including performing blind-processing on at least a portion of a sentence corresponding to the malicious comment, the performing blind-processing including rendering the portion of the sentence corresponding to the malicious comment invisible to each user who views the malicious comment such that each user is unable to reveal at least the portion of the sentence corresponding to the malicious comment;
   restricting, by the at least one processor, use of at least a portion of services for a user that registered the malicious comment; and
   providing the malicious comment in which the at least a portion of the sentence is blind-processed for displaying on a user terminal of said each user, wherein the providing the malicious comment includes
      rendering an entire sentence corresponding to the malicious comment invisible on the user terminal in response to a malicious comment filtering function being turned ON, and
      in response to the malicious comment filtering function being turned OFF
         replacing a malicious keyword included in the sentence corresponding to the malicious comment with at least one symbol, the replacement of the malicious keyword with the at least one symbol rendering the malicious keyword invisible to the user, and
         rendering the sentence corresponding to the malicious comment visible with the malicious keyword replaced with the at least one symbol on the user terminal.

2. The comment management method of claim 1, wherein the providing of the notification comprises:
   providing the registration disallowance notification for a comment for which the AI model determines a malicious comment prediction score greater than or equal to a first reference value; and
   providing the registration reconsideration request notification for a comment for which the AI model determines a malicious comment prediction score less than the first reference value and greater than or equal to a second reference value.

3. The comment management method of claim 2, wherein the providing of the notification further comprises:
   providing the registration disallowance notification for a comment that includes a keyword set as a banned word; and
   providing the registration reconsideration request notification for a comment that includes a keyword, the keyword being set as a substitution word that is a variant of the banned word.

4. The comment management method of claim 1, wherein the malicious keyword is a substitution word that is a variant of a banned word.

5. The comment management method of claim 1, wherein the comment selected by the administrator as a comment that violates the service operation regulation is used for at least one of learning of the AI model or for keyword collection.

6. The comment management method of claim 1, wherein the restricting comprises:
   restricting at least a portion of activities including a comment writing activity during a first period of time for a user that registers a comment for which registration reconsideration is requested a first number of times or more during a unit period.

7. A non-transitory computer-readable record medium storing instructions that, when executed by a processor, cause the processor to implement the comment management method of claim 1.

8. A computer apparatus comprising:
   memory storing computer-executable instructions; and at least one processor configured to execute the computer-executable instructions such that the at least one processor is further configured to, detect a malicious comment based on context through a learning-based artificial intelligence (AI) model during an attempt to register the malicious comment by simultaneously performing a first process of detecting a comment corresponding to a malicious comment criterion based on context of the comment corresponding to the malicious comment criterion, a second process of detecting a comment that includes a keyword that is included in a database, and a third process of processing a comment selected by an administrator through reporting or monitoring among registered comments as a comment that violates a service operation regulation;

provide a notification in response to the attempt to register the malicious comment, the notification being at least one of a registration disallowance notification or a registration reconsideration request notification;

register the malicious comment after a second attempt to register the malicious comment if the notification is the registration reconsideration request notification, the registering including performing blind-processing on at least a portion of a sentence corresponding to the malicious comment, the performing blind-processing including rendering the portion of the sentence corresponding to the malicious comment invisible to each user who views the malicious comment such that each user is unable to reveal at least the portion of the sentence corresponding to the malicious comment;

restrict use of at least a portion of services for a user that registered the malicious comment; and provide the malicious comment in which the at least a portion of the sentence is blind-processed for displaying on a user terminal of said each user, wherein providing the malicious comment includes rendering an entire sentence corresponding to the malicious comment invisible on the user terminal in response to a malicious comment filtering function being turned ON, and in response to the malicious comment filtering function being turned OFF replacing a malicious keyword included in the sentence corresponding to the malicious comment with at least one symbol, the replacement of the malicious keyword with the at least one symbol rendering the malicious keyword invisible to the user, and rendering the sentence corresponding to the malicious comment visible with the malicious keyword replaced with the at least one symbol on the user terminal.

9. The computer apparatus of claim 8, wherein the at least one processor is configured to execute the computer-executable instructions such that the at least one processor is further configured to, provide the registration disallowance notification for a comment for which the AI model determined a malicious comment prediction score greater than or equal to a first reference value, and provide the registration reconsideration request notification for a comment for which the AI model determined a malicious comment prediction score less than the first reference value and greater than or equal to a second reference value.

10. The computer apparatus of claim 9, wherein the at least one processor is configured to execute the computer-executable instructions such that the at least one processor is further configured to, provide the registration disallowance notification for a comment that includes a keyword set as a banned word, and provide the registration reconsideration request notification for a comment that includes a keyword set as a substitution word that is a variant of the banned word.

11. The computer apparatus of claim 8, wherein the malicious keyword is a substitution word that is a variant of a banned word.

12. The computer apparatus of claim 8, wherein the at least one processor is configured to execute the computer-executable instructions such that the at least one processor is further configured to use the comment selected by the administrator as a comment that violates the service operation regulation for learning of the AI model or for keyword collection.

13. The computer apparatus of claim 8, wherein the at least one processor is configured to execute the computer-executable instructions such that the at least one processor is further configured to restrict at least a portion of activities including a comment writing activity during a first period of time for a user that registers a comment for which registration reconsideration is requested a first number of times or more during a unit period.

* * * * *